No. 785,643. PATENTED MAR. 21, 1905.
M. J. TROOST.
STEAM TURBINE.
APPLICATION FILED NOV. 10, 1904.
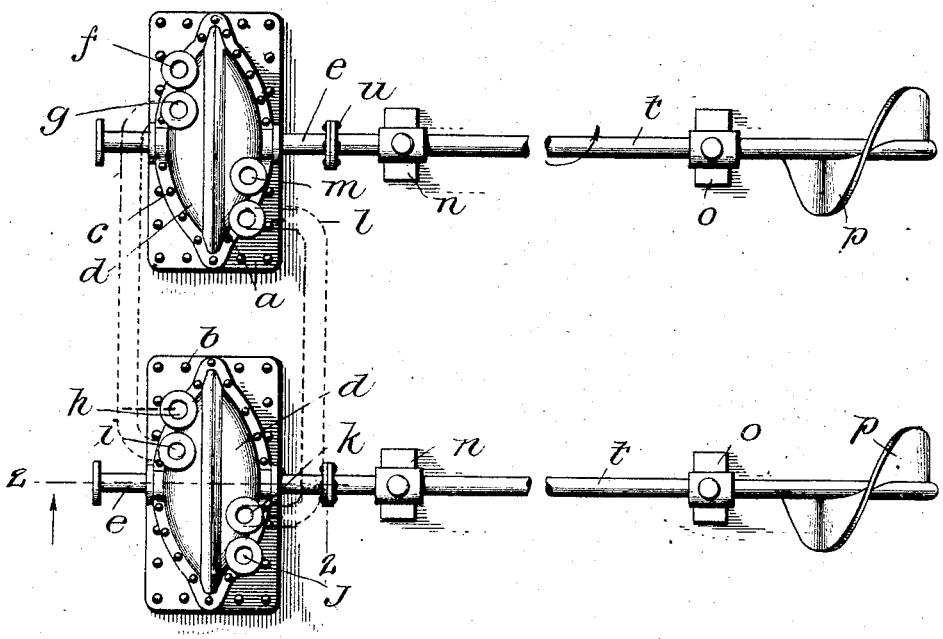
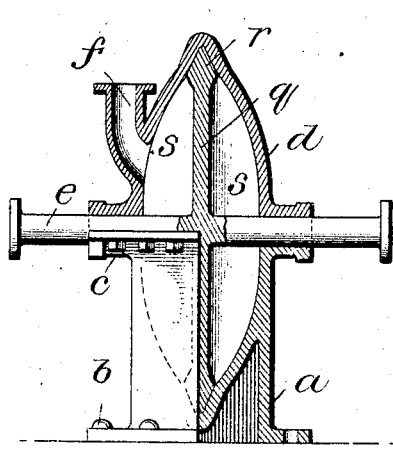 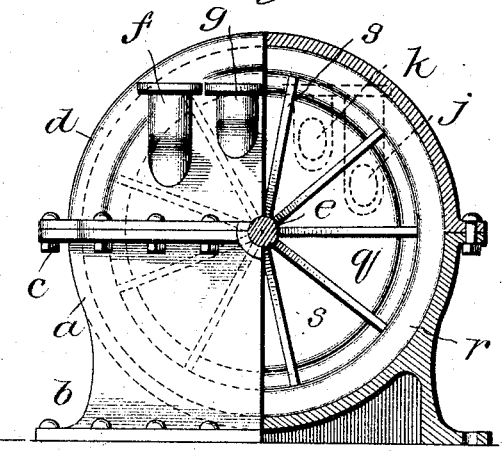
Witnesses
Geo. A. Bynue
W. Max. Duvall
Inventor
M. J. Troost
By Wilkinson & Fisher
Attorneys.

No. 785,643.

Patented March 21, 1905.

UNITED STATES PATENT OFFICE.

MARINUS JAN TROOST, OF ROTTERDAM, NETHERLANDS.

STEAM-TURBINE.

SPECIFICATION forming part of Letters Patent No. 785,643, dated March 21, 1905.

Application filed November 10, 1904. Serial No. 232,153.

*To all whom it may concern:*

Be it known that I, MARINUS JAN TROOST, a subject of the Queen of the Netherlands, residing at Rotterdam, Netherlands, have invented certain new and useful Improvements in Steam-Turbines; and I do hereby declare the following to be a full, clear, and exact description of the invention, such as will enable others skilled in the art to which it appertains to make and use the same.

My invention relates to improvements in steam-turbines, and more especially those designed for marine propulsion when twin screws are used; and the object of my invention is to provide a simple, efficient, and economical steam-turbine of this class.

With this object in view my invention consists in the construction and combinations of parts, as hereinafter described and claimed.

In the accompanying drawings, Figure 1 is a top view of two steam-turbines embodying my invention. Fig. 2 is a cross-section on the line 2 2 of Fig. 1. Fig. 3 is an end view, partly in section, of one of the turbines.

$a$ represents the lower half or base of the casing or shell of the turbine, which is fastened to any suitable support by bolts $b$. This casing or shell is made in two halves nearly similar in shape, the two halves $a$ and $d$ being connected by bolts $c$, which pass through projections on the halves of the shell. Preferably packing (not shown) is introduced between these two halves to make the casing or shell steam-tight.

$e$ represents the shaft, which is provided with vanes $s$, preferably made integral therewith and the whole cast of steel. The vanes $s$ project at right angles to a central web $q$, the upper part of which terminates in a pointed extension $r$, which closely fits within the shell. Packing may be used, if desired, between the turbine and the casing or shell.

$f$ represents the inlet-pipe for one of the steam-turbines, and $g$, which is arranged nearer the center thereof than the inlet $f$, represents the exhaust for the same.

$h$ represents the inlet for the second turbine, which is connected with the exhaust $h$ of the first turbine, as shown by the heavy dotted lines in Fig. 1.

$i$ represents the exhaust-outlet of the second turbine.

I have also devised means for reversing the motion of the shaft $e$ by means of inlets and exhausts located on the opposite side of the web $q$ and on opposite sides of the shell from the inlets and exhausts which are used for driving the vessel forward.

$j$ represents the steam-inlet used in reversing the engine, and $k$ the outlet of one of the turbines. The outlet $k$ is connected with the inlet $l$ of the other turbine, which is provided with an exhaust $m$.

$p$ represents any form of propeller, preferably cast integral with the shaft $t$, the shafts $e$ and $t$ being bolted together, as shown at $u$.

$n$ and $o$ represent bearings for the propeller-shaft.

The advantages claimed for my improved turbine are that a higher speed can be obtained than with the ordinary propeller, and my turbines are more economical in regard to repairs, oil, and coal, because the whole device works easier and the steam consumption is lower, as the propeller throws the water straight backward. The propeller works equally well in stormy weather and rough seas as when the weather is calm and the water is smooth.

Having thus described my invention, what I claim as new, and desire to secure by Letters Patent of the United States, is—

1. In a steam-turbine, the combination of a shell made in two parts and provided with two sets of inlet and exhaust ports, a shaft provided with a web made integral therewith and terminating in a tapered edge, and vanes secured to said shaft on each side of said web, substantially as described.

2. The combination of a pair of steam-turbines, a propeller-shaft running through each turbine, and a propeller attached to each propeller-shaft, each turbine being composed of a shell made in two parts and provided with two sets of inlet and exhaust ports, the propeller-shaft in each turbine being provided with a web made integral therewith and terminating in a tapered edge, and vanes secured to said shaft on each side of said web, substantially as described.

In testimony whereof I affix my signature in presence of two witnesses.

MARINUS JAN TROOST.

Witnesses:
JAN CJOUDSWAARD,
WILLEM OPDENKAMP.